United States Patent [19]

Nakanishi

[11] 4,226,258

[45] Oct. 7, 1980

[54] BALL VALVE

[75] Inventor: Sadayuki Nakanishi, Kobe, Japan

[73] Assignee: Kobe Steel, Limited, Kobe, Japan

[21] Appl. No.: 966,211

[22] Filed: Dec. 4, 1978

[30] Foreign Application Priority Data

Dec. 2, 1977 [JP] Japan .................................. 52-145487

[51] Int. Cl.³ .............................................. F04F 1/86
[52] U.S. Cl. ............................. 137/208; 137/246.22;
137/625.66; 251/31; 251/130; 251/172
[58] Field of Search ...................... 137/625.66, 246.22,
137/208; 251/163, 159, 172, 31, 130, 133

[56] References Cited

U.S. PATENT DOCUMENTS

| 2,653,004 | 9/1953 | Schnyder | 251/172 |
|---|---|---|---|
| 2,802,483 | 8/1957 | Davis | 251/31 X R |
| 3,007,490 | 11/1961 | Passmore | 251/159 X |
| 3,463,442 | 8/1969 | Leskiewicz | 137/625.66 X |
| 3,656,498 | 4/1972 | Grove | 251/172 X |
| 3,842,861 | 10/1974 | Jandrasi | 251/172 X |
| 4,106,748 | 8/1978 | Niino | 251/163 X |
| 4,120,478 | 10/1978 | Hasegawa | 251/31 |

FOREIGN PATENT DOCUMENTS

| 2339310 | 8/1973 | Fed. Rep. of Germany | 251/159 |
|---|---|---|---|
| 2556729 | 12/1975 | Fed. Rep. of Germany | 251/172 |

Primary Examiner—Harold W. Weakley
Attorney, Agent, or Firm—Oblon, Fisher, Spivak, McClelland & Maier

[57] ABSTRACT

A ball valve including a valve housing, a valve seat retainer fitted in a fluid passageway of the valve housing and being movable forwardly and backwardly within a given distance along the direction of movement of pressurized fluid, a sealed chamber formed in a portion of a spacing defined by the rear wall of the valve seat retainer and the inner wall of the valve housing, a channel formed in the valve housing for communicating the sealed chamber and an upstream fluid passageway, and a switch valve for opening or closing the channel to allow or prohibit movement of fluid within the upstream fluid passageway toward the sealed chamber, to vary the pressure force of the pressurized fluid acting on the valve seat retainer in the direction of movement of the pressurized fluid, whereby the valve seat retainer and the valve seat are displaced in the direction of movement of the fluid so as to come into contact with the periphery of the ball-shaped valve member when the pressurized fluid enters into the sealed chamber, and shifted in the direction opposite to the fluid movement to be thus disengaged therefrom when the pressurized fluid from the channel is precluded from entering the sealed chamber.

11 Claims, 7 Drawing Figures

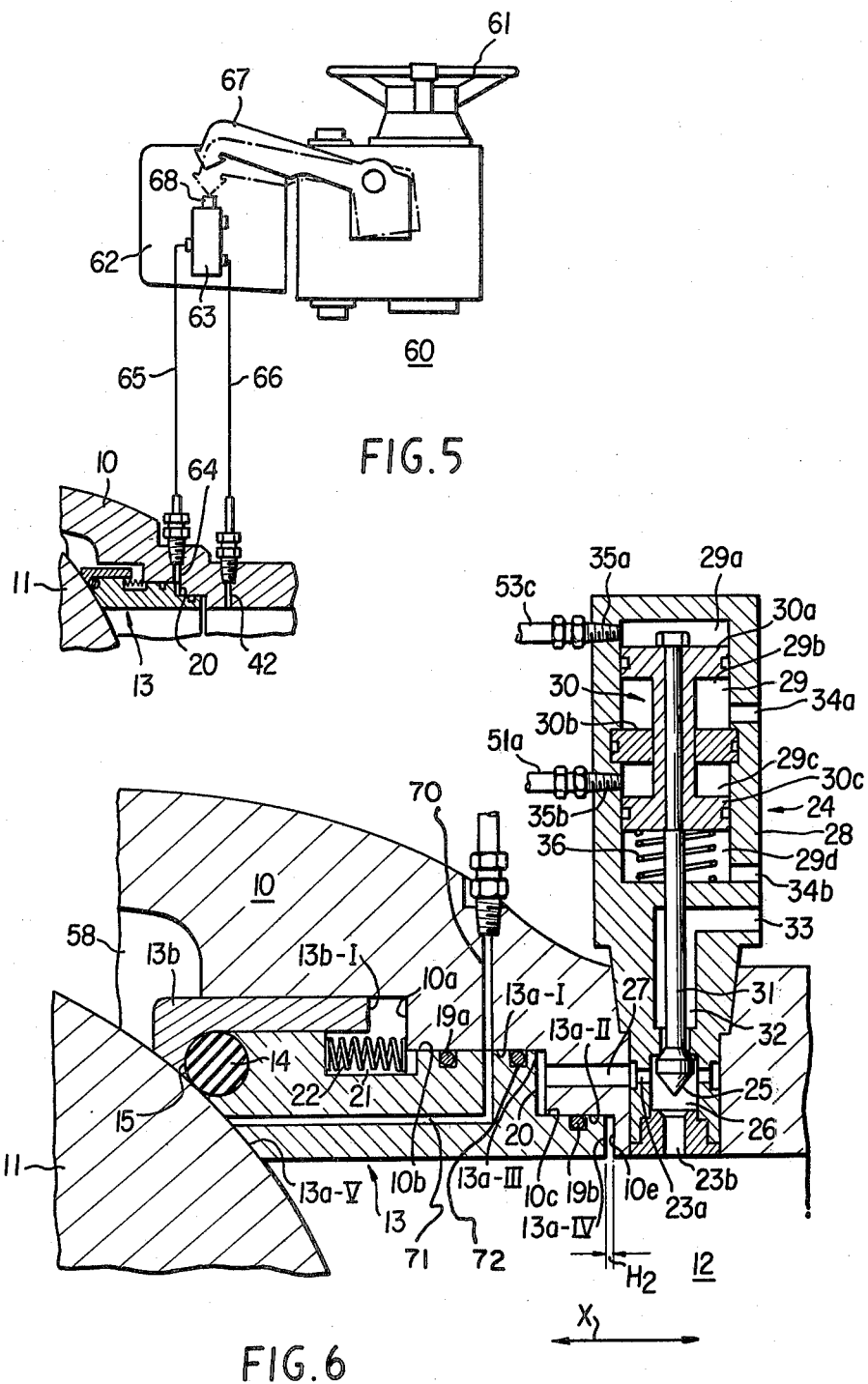

BALL VALVE

BACKGROUND OF THE INVENTION

1. Field of the Invention

This invention relates to a novel ball valve constructed so that in the opening and closing actions of a ball, a valve seat retainer is displaced to allow a valve seat to disengage itself from the peripheral surface of the ball.

2. Description of the Prior Art

Generally ball valves are of the construction illustrated in FIG. 1 of the accompanying drawings. Thus, an annular valve seat retainer 3 is accommodated in a fluid passageway 2 of a valve housing 1 in such a manner that such retainer 3 may be displaced both in an upstream and a downstream direction and an annular valve seat 4 supported by the valve seat retainer 3 abuts the peripheral surface of a ball 5 to establish a fluid-tight seal therebetween. In the above-noted arrangement, the valve seat 4 abuts in its entirety the periphery of the ball 5 in the fully opened and closed positions of the body but such is not the case in intermediate stages of rotation of the ball 5. Thus, partway between the fully closed and fully opened positions, a portion of the valve seat 4 is disengaged from the ball 5 to face an opening 6 bored through the ball 5. In this manner, while a part of the valve seat 4 is always in contact with the periphery of the ball 5, such is not true with the remaining part of the valve seat 4, and since these two parts are worn or damaged in dissimilar degrees due to their differential conditions of engagement with the peripheral surface of the ball 5, leakage of fluid can occur in the region as the valve is operated for a protracted time. Furthermore, because during the rotation of the ball 5, its peripheral surface is always urged against at least a part of the valve seat 4, the rotation of the ball 5 requires a large torque and, particularly where the valve seat 4 is constructed of rubber or other material having high coefficient of static friction, requires an actuator with a large output for the opening and closing operation of the ball 5.

SUMMARY OF THE INVENTION

The object of this invention is to provide a ball valve which is free from the above-mentioned disadvantages of the prior art valves of the same category.

More particularly, the object of this invention is to provide a ball valve which will withstand prolonged usage and require only a reduced torque for actuation.

According to one aspect of the present invention, in an upstream fluid passageway of a valve housing there is fitted a valve seat retainer movable forwardly and backwardly within a given distance along the direction of movement of the pressure fluid. A sealed chamber is formed in a portion of a spacing defined by the rear wall of the valve seat retainer and the inner wall of the valve housing. The valve housing is provided with a channel which communicates between the sealed chamber and the upstream fluid passageway. The channel is opened or closed by a switch valve which in turn allows or prohibits movement of fluid within the upstream fluid passageway toward the sealed chamber, varying the pressure force of the pressurized fluid exerted on the valve seat retainer in the direction of movement of the pressure fluid. When the pressurized fluid is allowed to enter into the sealed chamber, the valve seat retainer and the valve seat are displaced in the direction of movement of the fluid to come into contact with the periphery of the ball. On the other hand, if the pressurized fluid is precluded, the valve seat retainer and the valve seat are shifted in the direction opposite to the fluid movement and thus disengaged from the periphery of the ball. While the pressurized fluid within the upstream fluid passageway acts on the valve seat retainer both in the forward and backward direction of fluid movement, it is obvious that the direction of movement of the valve seat retainer is dependent upon not only the area but also the direction where pressure of the pressurized fluid is effective upon the retainer.

The sealed chamber of the ball valve embodying the present invention forming a portion of the pressure acting area can be affected or released from the pressure of the pressurized fluid by the action of the switch valve. In other words, when the pressure fluid flows into the sealed chamber, the area where the fluid pressure acts in the direction of movement of the fluid or toward the ball is extended so that the pressure urging the valve seat retainer toward the ball is increased as a whole and unbalanced with respect to the pressure in the opposite direction so as to shift the valve seat retainer toward the ball. On the other hand, when the pressurized fluid is precluded from the sealed chamber, the pressure acting area where the fluid pressure is exerted toward the ball is limited correspondingly so that the pressure urging the valve seat retainer toward the ball is reduced as a whole. Consequently, the opposite pressure is relatively greater such that the valve seat retainer moves away from the ball.

With the above summarized structure of the ball valve, the switch valve is operated to space the valve seat retainer away from the periphery of the ball during the opening and closing actions of the ball. Therefore, the opening and closing actions can be accomplished with an extremely small torque while not being in contact with the valve seat and the valve seat retainer. Thus, the valve seat is hardly worn in operation. Moreover, since the valve seat is uniformly in contact with the periphery of the ball under the same condition, the valve seat is hardly locally worn or damaged and leakage of the pressurized fluid is thus prevented.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIGS. 5 and 6 are are a schematic view and a fragmentary sectional view, respectively, of another embodiment of the present invention.

DETAILED DESCRIPTION OF THE PREFERRED EMBODIMENTS

Figure 1:
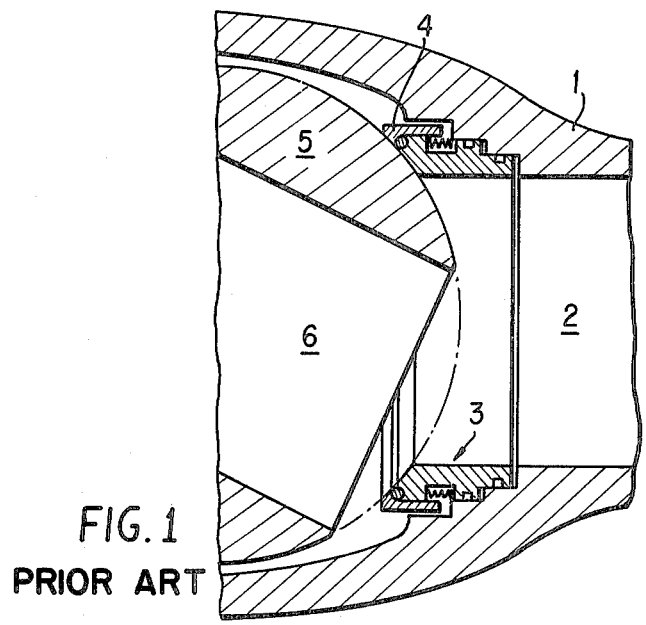
FIG. 1 is a fragmentary sectional view showing a prior art ball valve.
Figure 2:
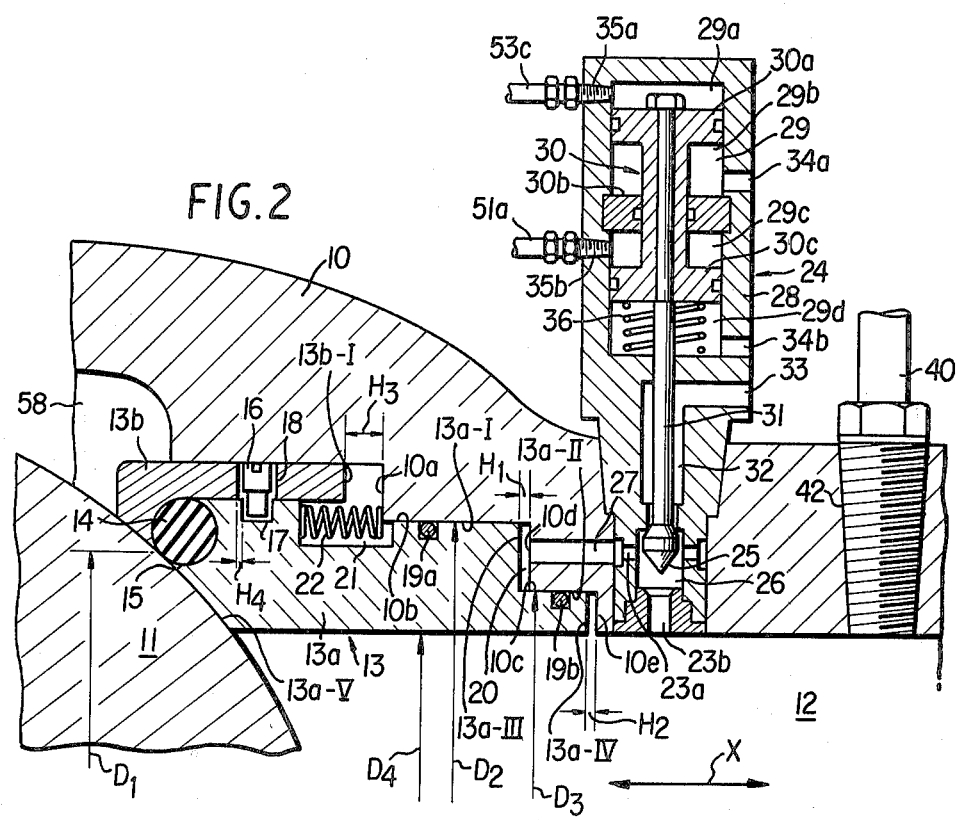
FIGS. 2 and 4 each show a fragmentary sectional view of a ball valve embodying the principles of the present invention.

Referring now to FIG. 2 which illustrates part of the ball valve in section, a ball 11 is rotatably mounted in a valve housing 10. The valve housing 10 supports an annular valve seat retainer 13 around an upstream fluid passageway 12 of the valve. The valve seat retainer 13 is freely displaceable over a predetermined dimension $H_1$ in the longitudinal direction X of the valve and an annular valve seat 14 secured to a forward end of the retainer 13 engages the periphery of the ball 11 as the retainer 13 is shifted to the left as viewed in FIG. 2. The aforementioned valve seat retainer 13 is provided with an inner ring 13a and an outer ring 13b fitted around the periphery of the inner ring 13a, and valve seat 14 being fitted in a groove 15 provided in the forward end of rings 13a and 13b as disposed in the above-noted manner. The valve seat 14 extends beyond groove 15 to contact the periphery of the ball 11 to establish a seal against the fluid. The forward ends of inner ring 13a and outer ring 13b are also curved to fit the periphery of the ball 11 in a coplanar contact relationship.

The outer ring 13a is secured to inner ring 13b by means of bolts 16. Thus, blind holes 17 in the periphery of the inner ring 13a and corresponding through-holes in the outer ring 13b are pierced by bolts 16 so as to secure the two ring members together.

The part of the valve housing 10 where valve seat retainer 13 is fitted is formed in a stepwise fashion as illustrated and the valve seat retainer 13 is also formed in a complementary stepwise configuration so that its exterior surfaces will engage the corresponding stepped surfaces of the housing in coplanar relationship. "O" rings 19a and 19b are provided in the peripheral walls 13a-I and 13a-II, respectively, of inner ring 13a. These "O" rings 19a and 19b respectively abut inner peripheral walls 10b and 10c of valve housing 10 which correspond to outer peripheral walls 13a-I and 13a-II, thereby establishing a fluid seal, while an annular space defined by a rear end wall 13a-III of inner ring 13a and an inner peripheral wall 10d of valve housing 10 is formed as a sealed chamber 20. The dimension $H_1$ in the longitudinal direction X of the chamber 20 corresponds to the distance of shift of valve seat retainer 13. On the other hand, the dimension $H_2$ of the clearance between a rear end wall 13a-IV of inner ring 13a and an inner peripheral wall 10c of valve housing 10 which is complementary therewith has the relationship $H_2 > H_1$, while the dimension $H_3$ of the clearance between a rear end wall 13b-I of outer ring 13b and an inner peripheral wall 10a of valve housing 10 which is complementary therewith has the relationship $H_3 > H_2$. The outer ring 13b is shiftable with respect to inner ring 13a over a dimension of $H_4$ in the direction of fluid flow X and this dimension has the relationship $H_4 < H_1$.

Recesses 21 are formed in appropriate positions on the outer periphery of inner ring 13a and coil spring 22 is biased in each of the recesses 21, one end of springs abutting the inner peripheral wall 10a of valve housing 10. Thus, the inner ring 13a and outer ring 13b are constantly biased by the coil springs toward the ball 11.

The diametrical dimension $D_1$ of the area of the valve seat 14 which engages the peripheral surface of the ball 11, the diametrical dimension $D_2$ of the outer peripheral wall 13a-I of inner ring 13a and the diametrical dimension $D_3$ of the outer peripheral wall 13a-II thereof satisfy the relation $D_2 > D_1 > D_3$. $D_4$ denotes the inner peripheral diameter of the inner ring 13a.

The valve housing 10 is further provided with a switch valve 24 for controlling the displacement of the valve seat retainer having the above-described construction. This switch valve 24 is intended to control the inflow or shut-off of the pressurized fluid from the upstream fluid passageway 12 into sealed chamber 20.

Thus, extending downward as viewed in FIG. 2, a channel 23b is provided from a switching chamber 26 in which a needle 25 is actuated to open or close the switch valve 24 which, in turn, communicates with upstream fluid passageway 12. Also, extending to the left, as viewed in FIG. 2, from switching chamber 26 is another channel 23a which, in turn, communicates with a channel 27 which also in turn communicates with sealed chamber 20. The aforesaid needle 25 is operated by a piston arrangement. Thus, a switch valve housing 28 has a cavity 29 in which a piston assembly 30 comprising a couple of pistons 30a and 30c is slidably accommodated. The piston assembly 30 is provided with a piston rod 31 which, in turn, is provided with needle 25 at its forward end so that needle 25 may slide along channel 32 in housing 28.

The channel 32 communicates at one end thereof with the switching chamber 26 and at the opposite end thereof with the cavity 29. The channel 32 also leads to a free channel 33 which in turn is accessible to the surrounding atmosphere at its one end. The housing 28 is further provided with a couple of pressure outlets 34a, 34b, a couple of pressure inlets 35a, 35b, a coil spring 36, and a partition wall 30b. The coil spring 36 rests in the cavity 29d formed beneath the piston 30c as shown and continuously urges the piston assembly 30 upwardly. One of the pressure outlets 34b is coupled with the cavity 29c, whereas the other pressure outlet 34b is coupled with a cavity 29b defined by the piston 30a and the partition wall 30b located at the center of the cavity 29. One of the pressure inlets 35a is also coupled with a pressure chamber 29a formed above the piston 30a as shown and the other pressure inlet 35b is coupled with a pressure chamber 29c defined by the partition 30b and the piston 30c. The needle 25 serves to switch communication of the channel 27 to the through hole 32 or to the channel 23b upon the upward and downward action of the piston assembly 30. As seen from FIG. 2, the needle 25, when raised, shuts the opened end of the channel 32 and opens the opened end of the channel 23b so that pressure fluid within the fluid passageway 12 enters into the sealed chamber 20 through the channel 23b, the switching chamber 26, the channel 23a and the channel 27 in the aforementioned order. In contrast, the needle 25 when dropping opens the opened end of the channel 32 and shuts the opened end of the channel 23b, allowing the sealed chamber 20 to lead to the surrounding atmosphere through the channel 27, the channel 23a, the switching chamber 26, the channel 32 and the channel 33. As noted earlier, the switching operation of the needle 25 of the switching valve 24 is effected by the upward and downward action of the piston assembly 30. The upward action of the piston assembly 30 is affected by a restoring force of the coil spring 36 and the downward action of the piston assembly 30 is caused by the structural assembly described below.

This assembly is illustrated in FIGS. 3A and 3B wherein reference numeral 40 denotes a conduit communicating between the central valve 41 and the upstream fluid passageway 12 and having one end thereof connected to an opening 42 formed in the peripheral wall of the upstream fluid passageway 12 of the valve housing 10 and the opposite end thereof connected to the switching chamber 43 of the control valve 41. As seen more clearly from FIG. 3B, the control valve 41 comprises a couple of valve bodies 44a, 44b which are received within the switching chamber 43 and biased in a certain direction by coil springs 45a, 45b. At opposite ends of the coil springs 45a, 45b there are provided rods 46a, 46b which urge the valve bodies 44a, 44b against the spring force of the coil springs 45a, 45b. With a lever 48 rotatable about a pin 47, either of the rods 46a, 46b are urged inwardly. The switching chamber 43 is split into four regions via the two valve bodies 44a, 44b. Conduits 40, 49a, 49b and a free-end conduit 49c communicate with these regions 43a, 43b, 43c, and 43d, respectively. The opposite end of the conduit 49b leads to a gas-oil reservoir or hydro-pneumatic loading device 50a which converts the pressure of gas passing the conduit 49b into oil pressure. The resulting oil pressure is applied to an actuator assembly 52 which opens and closes the ball 11. The conduit 51 is linked to branch conduits 51a, 51b, 51c. One end of the branch conduit 51a leads to the pressure inlet 35b of the switch valve 24 of FIG. 2. The remaining branch conduits 51b, 51c lead to pressure chambers 52a, 52b of the actuator assembly 52, respectively.

The conduit 49a leading to the cavity 49a in the switching valve 41, on the other hand, is linked to a second gas-oil reservoir 50b which in turn is connected to pressure chambers 52c, 52d of the actuator assembly 52 via the conduit 53 and the branch conduits 53a, 53b. The conduit 53 is also branched into a branch conduit 53c which leads to the pressure inlet 35a of the switch valve 24 of FIG. 2. It will be noted that the conduits 51, 53 pass through a hand pump 54. The actuator assembly 52 includes pistons 55a and 55b between the pressure chambers 52a, 52c and between the pressure chambers 52b, 52d, the pistons 55a, 55b being coupled with a piston rod 56. Within the chamber 52d extending between the pressure chambers 52a, 52b, the piston rod 56 moves in unison with a yoke 57 secured on the rotation axis of the ball 11. Eventually, the conduit 49c leading to the region 43d of the control valve 41 is freely guided to atmosphere.

With such an arrangement, one preferred embodiment of the ball valve embodying the present invention operates in the following manner.

It is now to be assumed that the pressurized fluid (gas in the given example) is introduced into the upstream fluid passageway 12 and the ball 11 stands in a closed state (the state shown in FIG. 2). In this case the lever 48 of the control valve 41 is held in an intermediate position (as shown in FIGS. 3A and 3B). Since the valve bodies 44a, 44b within the control valve 41 are forced to the right side of the drawings by the coil springs 45a, 45b, the pressurized fluid entering into the region 43a via the upstream fluid passageway 12 settles therein, not reaching the conduit 51 or 53. No oil pressure is therefore exerted within the pressure chamber 29a or 29c of the switch valve 24 via the branch conduit 51a or 53c. The result is that the piston assembly 30 is urged upwardly by the coil spring 36 so as to open the opened end of the channel 23b and shut off the counterpart of the channel 32. Thus, the pressurized fluid within the upstream fluid passageway 12 flows into the annular sealed chamber 20 through the channel 27, thereby acting on not only the rear wall 13a-IV but also the rear wall 13a-III defining the sealed chamber 20 and urging the inner ring 13a in the forward direction of the fluid. The pressurized fluid also serves to move the inner ring 13a in the opposite direction to the fluid traveling direction. In other words, the wall 13a-V at the end of the inner ring 13a abuts the periphery of the ball-shaped valve body 11 with a slight spacing therebetween. The pressurized fluid is communicated into such spacing, acting on the wall 13a-V and a portion of the valve seat 14. While viewing the pressure acting on the valve seat retainer 13 in the fluid traveling direction X, the pressure $P_1$ in the forward direction of the fluid is $\pi\{(D_2^2-D_3^2)+(D_3^2-D_4^2)\}(P_A-P_B)/4$ and the pressure $P_2$ in the reverse direction is $\pi(D_1^2-D_4^2)(P_A-P_B)/4$, wherein $P_A$ is the pressure within the upstream fluid passageway 12 per unit area and $P_B$ is the pressure within the body cavity 58 per unit area. Since $P_1>P_2$, the valve seat retainer 13 is urged against the periphery of the ball 11 due to a differential pressure, namely, the self-tensioned force $\Delta P(=\pi(D_2^2-D_1^2)(P_A-P_B)/4$. When this occurs, the coil spring 22 urges the valve seat retainer 13 in the forward direction of the fluid. The valve seat 14 held by the retainer 13 therefore comes into contact with the periphery of the ball 11, providing a seal for the fluid. The end wall 13a-V of the inner ring 13a is also in contact with the periphery of the valve body 11, providing a seal for the fluid.

The ball-shaped valve body 11 in the closed state will change to the opened state in the following manner. In this case, the lever 48 of the control valve 41 should be rotated in the direction $Y_1$ shown in FIG. 3B. The lever 48 when rotated shifts the rod 46b in such a way that the valve body 44b moves to the left side against the force of the coil spring 45b. As a consequence, the pressurized fluid within the region 43a flows into the region 43c and then into the gas-oil reservoir 50a via the conduit 49b. Within the gas-oil reservoir 50a, the pressure of the pressurized fluid is converted into the oil pressure and the pressurized oil is guided into the pressure chambers 52a, 52b of the actuator assembly 52 via the conduit 51 and the branch conduit 51b, moving the pistons 55a, 55b to the right side of FIG. 3A together with the piston rod 55. At this time, the yoke 57 rolls with the piston rod 56 to thereby open the ball 11. By the action of the pistons 55a, 55b, the pressurized oil in the pressure chambers 52c, 52d reaches the gas-oil reservoir 50b via the branch conduits 53a, 53b and the conduit 53, converting the oil pressure into gas pressure. After flowing into the region 43b of the switching valve via the conduit 49a, the gas is discharged from the free-end conduit 49c to the atmosphere via the region 43d.

The pressurized oil reaches the conduit 51 and then the branch conduit 51a and enters into the pressure chamber 29c of the switch valve 24, actuating the piston 30c and urging the piston assembly 30 and the piston rod 31 as shown in FIG. 2 (the piston assembly 30 being actuated under a pressure lower than that necessary to rotate the ball 11). In this way, the needle 25 departs from the opened end of the channel 32 and falls within the switching chamber 26, shutting off the opened end of the channel 23b. Accordingly, while the pressurized fluid within the upstream fluid passageway 12 is precluded from entering into sealed chamber 20, the pressurized fluid present within sealed chamber 20 is freely discharged to atmosphere via channel 27, channel 23a, switching chamber 26, channel 32 and free-end channel 33, sequentially. Thus, atmospheric pressure rather than the pressurized fluid acts on the rear wall 13a-III of the sealed chamber 20 provided that the self-tensioned force $\pi(D_1^2-D_3^2)(P_A-P_B)$ is lower than the pressure $P_B$ at which the force of the spring is exceeded. The inner ring 13a will return in the opposite direction of the fluid advancement by the distance $H_1$. After the inner ring 13a has begun receding, the outer ring 13 b returns together with the inner ring 13a at a point in time where the distance $H_4$ between the bolt 16 and the blind hole 17 reaches zero. The valve seat 14 and the valve seat retainer 13, which are in contact with the periphery of the ball 11 when in the closed position, are spaced way from the periphery of the ball 11, as shown in FIG. 4.

The opening operation of the ball 11 will start after the valve seat 14 and the valve seat retainer 13 are completely spaced away from the ball 11. The opening operation of the ball 11 is carried out under the condition that the valve seat and the valve seat retainer are out of contact with the periphery of the valve ball. After completion of the opening operation of the ball 11, the control valve 41 is returned to the intermediate position. The valve bodies 44a, 44b within the control valve 41 are therefore returned to the original positions thereof (as seen in FIG. 3B), shutting off communication between the regions 43a, 43c and preventing the pressurized fluid from entering into conduit 49b. When the opening operation of the ball is completed, the piston assembly 30 of the switch valve 24 is returned to the original position (FIG. 2) due to the spring force of the coil spring 36, raising the needle 25. As a result, the pressurized fluid within the upstream fluid passageway 12 flows into the sealed chamber 20 and acts on the rear wall 13a-III of the inner ring 13a to again move the valve seat retainer 13 in the direction of the fluid flow in cooperation with the biasing force of the coil spring 22.

In the foregoing description, the ball 11 shifts from the closed state to the opened state. On the other hand, if it is desired to shift the ball 11 from an opened state to a closed state, the valve member 25 and the valve seat retainer 13 of the switch valve 24 can be operated substantially in the same manner. In this case, all that is necessary is to rotate the lever 48 of the control valve 41 in the direction $Y_2$ as viewed from FIG. 3B. If the lever 48 is rotated in the direction opposite to that of the opening operation $Y_1$, the valve member 44a will move so that the pressurized fluid and the pressurized oil move in the opposite direction to the opening operation. The pistons 55a, 55b and the piston rod 56 within the actuator 52 shifts accordingly to the left and the yoke 57 rolls with a tendency to close the ball 11. The pressurized oil passing over the conduit 53 and the branch conduit 53c reaches the pressure chamber 29a in the switch valve 24, thereby lowering the piston assembly 30. Accordingly, the valve member 26 and the valve seat retainer 13 operate in the same manner as in the opening operation. Even in the closing operation the valve seat retainer 13 and the valve seat 14 are disengaged from the periphery of the ball 11. If the lever 48 of the control valve is returned to the intermediate position immediately after closing the ball 11 thoroughly, then the valve seat retainer 13 will be restored to the original position and in the direction of movement of the fluid as in the opening operation.

Figure 3:
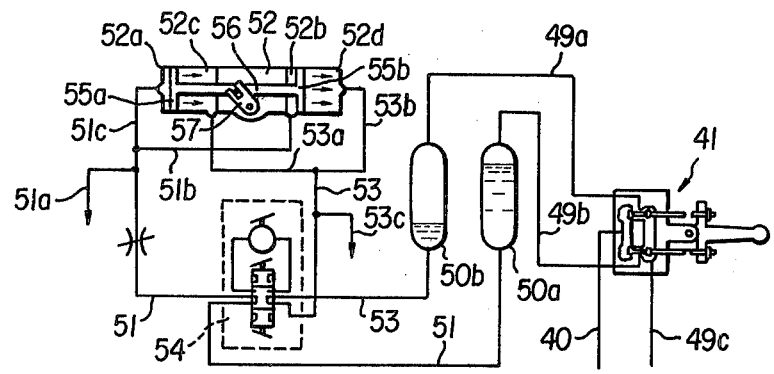
FIG. 3A is a circuit diagram showing mechanisms for driving a control valve 41 and an actuator 52.
FIG. 3B is an enlarged sectional elevation view showing a control valve 41.
Figure 3:
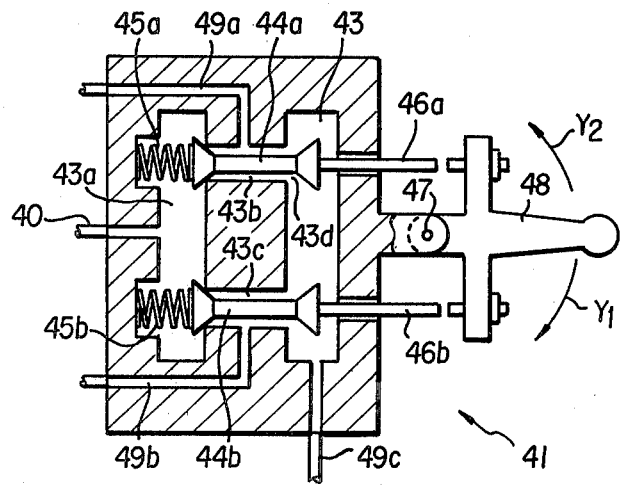
Figure 4:
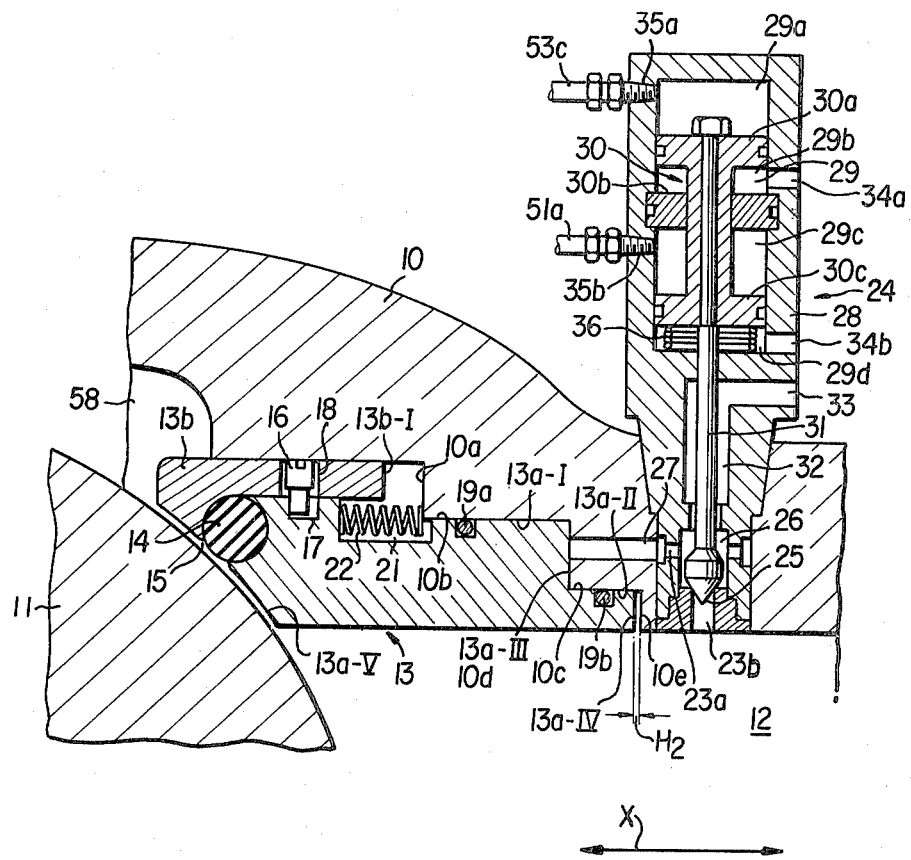

The embodiment of FIGS. 2 through 4 has been described with respect to its construction and operation. Such embodiment is easy to handle because, with only manual operation of the lever 48 of the control valve 41, the valve seat retainer 13 is first detached from the ball 11 and thereafter the opening or closing operation of the ball 11 is carried out due to the pressure of the fluid flowing through the valve. The ball 11 is opened and closed without contact with the valve seat 14 and the valve seat retainer 13. This minimizes the torque requirement for rotation of the ball 11, largely facilitates the rotation of the ball 11 and alleviates abrasion and damage of the valve seat.

Although the switch valve 24 and the construction of the embodiments of FIGS. 3A and 3B are employed to switch the direction of movement of the valve seat retainer and open and close the ball 11 in the embodiment described hereinabove, an electromagnetic valve may be used to switch the direction of the movement of the valve seat retainer and the ball 11 may be opened and closed by a motor or manually in an alternative embodiment as shown in FIG. 5.

In the embodiment of FIG. 5, the ball 11 is opened and closed by association with an electromagnetic valve to thereby shift the valve seat retainer 13. An operation box is provided with a manually operable handle 61, a motor 62 and an electromagnetic valve 63. While the operation box 60 is depicted as being spaced from the ball valve assembly, the rotational axis of the handle 61 is actually connected to the ball-shaped valve member 11. A channel 64 is formed in the valve housing 10 and the sealed chamber 20 defined by the wall of the valve housing 10 and the rear wall of the valve seat retainer communicates via the channel 64 with one end of a conduit 65 which has the opposite end thereof connected to the electromagnetic valve 63. Another conduit 66 has one end thereof communicating with the channel 42 of the valve housing 10 and the opposite end thereof connected to the electromagnetic valve 63. A lever 67 is provided for selection of the motor 62 or the manual handle 61 and stands in the position denoted by the solid line when the motor 62 is selected. A switch (not shown) for the motor 62 is operatively associated with the switching operation of the electromagnetic valve. In other words, the electromagnetic valve establishes a path between the conduits 66, 65 when the switch for the motor 62 is turned on, and serves to shut off the path when the same is turned off. When the switching lever 67 is rotated downwardly (the position denoted by the phantom line), the motor 62 is deenergized and the manual handle 61 becomes operable. When the electromagnetic valve 63 falls, the tip of the switching lever 67 reaches the position where a pushbutton switch 68 is engageable. The pushbutton switch 68 in the depressed state energizes the electromagnetic valve to establish the path between the conduits 66, 65. Otherwise, if the switching lever 67 is lifted, the electromagnetic valve will be restored to the original position to cut off communication between the conduits 66, 65.

FIG. 6 shows another embodiment wherein means are added for injecting a sealant to the periphery of the ball 11. In this modification, channels 70, 71 communicating with each other are formed in the valve housing 10 of the ball valve assembly shown in FIG. 2 and the inner ring 13a, respectively. One end of the channel 71 is connected to the wall 13a-V. A path between the channels 70, 71 is formed when the valve seat retainer 13 is urged by the ball 11. Another "O" ring 72 is further located about the outer wall 13a-I of the inner ring 13a, preventing the externally injected sealant from entering into the sealed chamber 20. The sealant is supplied to the periphery of the ball valve 11 via the channels 70, 71.

Obviously, many modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A ball valve having pressure biased seats, comprising:
   a housing having a valve cavity and an inlet port;
   a rotatable ball valve positioned in the cavity and being movable between open and closed positions;
   an actuator connected with the ball valve to move it between its open and closed positions;
   said housing having a stepped recess formed in the inner wall surface thereof at said cavity;
   a seat retainer positioned in the stepped recess for longitudinal movement toward and away from the ball, and having a stepped configuration complemental to the stepped configuration of the recess, and carrying sealing means for sealing engagement with the wall of the recess to define a sealed chamber;
   a seat carried by the retainer in a position to engage the ball valve;
   said housing having channel means therein communicating at one end thereof with upstream fluid pressure in the inlet port, and communicating at its other end with the sealed chamber;
   a switching valve in the channel means for controlling flow therethrough and including a valve member reciprocable between opposed valve seats, said valve member enabling flow from the inlet port to the sealed chamber when the valve member is in a first position against one of the valve seats and precluding flow from the inlet port to the sealed chamber when it is in a second position against the other valve seat, said sealed chamber being vented to a low pressure area when the valve member is in its second position; and
   switching valve actuator means for moving said valve member between its first and second positions, including a cylinder having first and second ends and a transverse dividing wall therebetween separating said cylinder into first and second chambers, a piston assembly having a first piston reciprocable in the first chamber and a second piston reciprocable in the second chamber, said pistons being fixedly secured to each other and to a piston rod connected to the valve member, and fluid pressure control means connected with the ball valve actuator and with the switching valve actuator to introduce fluid pressure into the first chamber to move the piston assembly and the valve member to preclude flow from the inlet port to the sealed chamber when the ball valve actuator is actuated to move the ball valve from open to closed position, and to introduce fluid pressure to the second chamber to move the piston assembly and valve member to preclude flow from the inlet port to the sealed chamber when the ball valve actuator is actuated to move the ball valve from closed to open position, said piston assembly and valve member being biased by a spring means in a direction to enable flow from the inlet port to the sealed chamber.

2. The ball valve as set forth in claim 1 which further comprises means for introducing a sealing liquid onto the surface of said ball member.

3. A ball valve having pressure biased seats, comprising:
   a housing having a valve cavity and an inlet port;
   a rotatable ball valve positioned in the cavity and being movable between open and closed positions;
   an actuator connected with the ball valve to move it between its open and closed positions;
   said housing having a stepped recess formed in the inner wall surface thereof at said cavity;
   a seat retainer positioned in the stepped recess for longitudinal movement toward and away from the ball, and having a stepped configuration complemental to the stepped configuration of the recess, and carrying sealing means for sealing engagement with the wall of the recess to define a sealed chamber;
   a seat carried by the retainer in a position to engage the ball valve;
   said housing having channel means therein communicating at one end thereof with upstream fluid pressure in the inlet port, and communicating at its other end with the sealed chamber;
   switching valve means in the channel means and having a first position enabling flow from the inlet port to the sealed chamber, and a second position precluding flow from the inlet port to the sealed chamber and venting the sealed chamber to a low pressure area, said switching valve means having a fluid pressure actuator;
   control means for the switching valve means, including a control valve having an inlet connected with the pressure fluid in the inlet port, an outlet, and a manually operable valve member having a first position to preclude flow from the inlet to the outlet and a second position to enable flow from the inlet to the outlet, and conduit means connected from the outlet to the actuator for the switching valve means, whereby when the control valve is actuated to its second position pressure fluid is admitted from the inlet port to the conduit means and pressure is applied to the actuator of the switching valve means to operate the switching valve means; and
   said conduit means being connected with said ball valve actuator to operate said ball valve when the control valve is operated, said control means and switching valve means effecting retraction of said seat retainer and seat from the ball valve before movement of the ball valve between its opened and closed positions.

4. The ball valve as set forth in claim 3 which further comprises means for introducing a sealing liquid onto the surface of said ball member.

5. The ball valve as set forth in claim 3, wherein:
   the control valve has first and second outlets, and conduit means connecting both outlets with the switching valve actuator, said control valve having a third position enabling flow from the inlet to the second outlet; and
   said conduit means and control valve being connected such that when the ball valve is actuated from closed to opened position, flow is from the inlet to one of said outlets, and when the ball valve is actuated from the opened to closed positions, flow is from the inlet to the other of said outlets.

6. The ball valve as set forth in claim 3, wherein:
hydro-pneumatic loading devices are connected in the conduit means between the control valve outlets and the switching valve and ball valve actuators for converting pneumatic pressure supplied to the control valve to hydraulic pressure applied to the actuators.

7. The ball valve as set forth in claim 3, wherein:
hand pump means is connected in the conduit means for energizing the actuators.

8. The ball valve as set forth in claim 5, wherein:
the control valve comprises a body having an inlet chamber connected with the inlet, a pair of outlet chambers connected respectively with the outlets and with the inlet chamber, and a vent chamber connected with the outlet chambers, a pair of valve members reciprocable in the chambers between a first position precluding flow from the inlet chamber to the outlet chambers while enabling flow from the outlet chambers to the vent chamber, and a second position enabling flow from the inlet chamber to the outlet chambers while precluding flow from the outlet chambers to the vent chamber, means biasing the valve members to their first position, and manual actuator means having a neutral position whereat both valve members are in their first position, said manual actuator means being operable to a first position to engage one of the valve members and move it to its second position and operable to a second position to engage the other of said valve members and move it to its second position.

9. The ball valve as set forth in claim 8, wherein:
a hydro-pneumatic loading device is connected in the conduit means from each outlet;
the ball valve actuator comprises a double ended piston connected to operate the ball valve to opened position upon reciprocation of the double ended piston in one direction and to operate the ball valve member to closed position upon reciprocation of the double ended piston in the opposite direction; and
first conduit means connected from one hydro-pneumatic loading device to one end of the double ended piston, and second conduit means connected from the other hydro-pneumatic loading device to the other end of the double ended piston.

10. The ball valve as set forth in claim 9, wherein:
the switching valve actuator comprises a pair of rigidly interconnected pistons, said first conduit means being connected with one of the pistons and the second conduit means being connected with the other of said pistons.

11. A ball valve having pressure biased seats, comprising:
a housing having a valve cavity and an inlet port;
a rotatable ball valve positioned in the cavity and being movable between open and closed positions;
an actuator connected with the ball valve to move it between its open and closed positions;
said housing having a stepped recess formed in the inner wall surface thereof at said cavity;
a seat retainer positioned in the stepped recess for longitudinal movement toward and away from the ball, and having a stepped configuration complemental to the stepped configuration of the recess, and carrying sealing means for sealing engagement with the wall of the recess to define a sealed chamber;
a seat carried by the retainer in a position to engage the ball valve;
said housing having channel means therein communicating at one end thereof with upstream fluid pressure in the inlet port, and communicating at its other end with the sealed chamber;
switching valve means in the channel means and having a first position enabling flow from the inlet port to the sealed chamber, and a second position precluding flow from the inlet port to the sealed chamber and venting the sealed chamber to a low pressure area, said switching valve means having a fluid pressure actuator;
said switching valve means comprising an electromagnetic valve; and
said ball valve actuator comprising an electric motor having a switch for controlling energization thereof, said switch also being operatively connected to energize the electromagnetic valve when the motor is energized whereby energization of the motor to operate the ball valve also effects energization of the switching valve to retract the seat retainer and seat from the ball valve prior to movement of the ball valve between its opened and closed positions, said ball valve actuator further including a manual actuator connected to actuate the ball valve in lieu of actuation by the electric motor, and a lever connected with the manual actuator to engage a switch and energize the electromagnetic valve when the manual actuator is operated.

* * * * *